United States Patent [19]

Jones

[11] Patent Number: 4,533,644
[45] Date of Patent: Aug. 6, 1985

[54] MORTAR

[75] Inventor: Cecil M. Jones, Worcester, Mass.

[73] Assignee: Norton Company, Worcester, Mass.

[21] Appl. No.: 575,108

[22] Filed: Jan. 30, 1984

[51] Int. Cl.³ .................... C04B 35/18; C04B 35/48; C04B 19/04

[52] U.S. Cl. ........................ 501/17; 106/84; 428/698; 501/32; 501/107; 501/127; 501/128

[58] Field of Search ................ 501/127, 128, 32, 107, 501/17; 106/84; 428/698

[56] References Cited

U.S. PATENT DOCUMENTS

| | | | |
|---|---|---|---|
| 1,081,536 | 12/1913 | Jeppson | 501/127 |
| 1,251,888 | 1/1918 | Horn | 501/127 |
| 1,442,413 | 1/1923 | Olsson | 501/127 |
| 1,893,313 | 1/1933 | Willetts | 501/127 |
| 3,197,315 | 7/1965 | Jacobs et al. | 106/65 |
| 3,303,034 | 2/1967 | Troell et al. | 106/65 |
| 4,090,881 | 5/1978 | Keel et al. | 106/68 |
| 4,222,782 | 9/1980 | Alliegro et al. | 106/57 |
| 4,244,745 | 1/1981 | Havranek et al. | 106/64 |

Primary Examiner—Mark L. Bell
Attorney, Agent, or Firm—Arthur A. Loiselle, Jr.

[57] ABSTRACT

A mullite containing cementing mix particularly suited for silicon carbide containing shapes is shown that is adapted to be initially activated when mixed with water and set by air drying so that it can subsequently permanently set by firing the mortar in situ. The mullite component is first mixed in a raw batch with ball clay, a chemically active alumina, bentonite, sodium silicate and a borosilicate glass frit and then after this composition is mixed with water and air dried, the cement is fired in place to react certain of the constituents in the mix and sinter the mullite phase in a bonded relation with the surface of the shapes being cemented in place. A refractory furnace liner or the like may thus be fabricated for example wherein the silicon carbide containing shapes forming the liner are held in place with an inert strongly adhering cement having substantially the same thermal expansion properties as the shapes being bonded.

7 Claims, No Drawings

MORTAR

TECHNICAL FIELD

This invention relates to a mortar for use with silicon carbide refractory shapes bonded with oxides, silicon oxynitride or silicon nitride.

BACKGROUND ART AND INFORMATION DISCLOSURE STATEMENT

The following is a list of the most pertinent prior art disclosures known to the inventor at the time of the filing of this application:

| U.S. PAT. NOS. | | |
| --- | --- | --- |
| 1,081,536 | Jeppson | Dec. 16, 1913 |
| 1,251,888 | Horn | Jan. 1, 1918 |
| 1,442,413 | Olsson | Jan. 16, 1923 |
| 1,893,313 | Willetts | Jan. 3, 1933 |
| 3,197,315 | Jacobs et al | July 27, 1965 |
| 3,303,034 | Troell et al | Feb. 7, 1967 |
| 4,090,881 | Keel et al | May 23, 1978 |
| 4,222,782 | Alliegro et al | Sept. 16, 1980 |
| 4,244,745 | Havranek et al | Jan. 13, 1981 |

The Jeppson patent contains an early disclosure of a cement that includes a predominant amount of a fused crushed alumina grain for bonding aluminous bricks. The mix is in the proportions of 85 to 95 parts of the alumina grain together with a suitable bonding material in the form of a neutral clay or acid plastic clay or lime or magnesia adapted to be mixed with water and fired in place to provide a cement that does not react with the aluminous bricks.

Horn describes an alumina and clay mixture adapted to be cast or molded for making ceramic objects. He provides a mixture that is "high in alumina" to which is added a ground mix of burnt clay and lean clay, for example shale. Molded and fired objects made with this mix are described as being able to withstand exposure to temperature changes, are long wearing, have a high degree of impermeability, and have high strength. It is suggested that ceramic heating elements and other bodies may be made by casting or compression molding and firing without undue distortion, to produce articles that are well adapted to withstand internal and external pressures.

There is no disclosure suggesting a use of this Horn mixture as a cement for bricks.

Olsson describes a mix of essentially 95% alumina and 5% bentonite having refractory properties adapted to serve as a liner for furnaces and crucibles. It is alleged that the 5% of bentonite is sufficient clay to serve as a binder while rendering the mix plastic as it is being worked to produce a lining that contained a higher percentage of refractory material than was then theretofore known.

Willetts teaches the art how to make a fired refractory brick having a superior resistance to shrinkage and spalling in use. He proposes a mixture of white bauxite, Georgia Klondike white kaolin and a hard bauxitic fire clay which is a reactive mix that upon being fired produces a mullite with a glassy matrix that has a high point of fusion. The mix described may be molded and fired to produce bricks or refractory blocks that are resistant to deformation, slagging and spalling when in use.

Jacobs et al discloses a gunning mix adapted to be wetted and rammed into place to be fired. The mix includes alumina and clay together with wetting and lubricating components that enable the mix to be readily wetted and placed when the lining is to be installed. This mixture has high green strength upon being dried and can then be fired to allegedly have excellent high strength characteristics as a monolithic surface structure that is free of joints such as ordinarily found in brick lined furnaces.

Troell et al also describes a ramming cement mix making use of alumina and a bentonite clay mix together with a phosphoric acid component. It is stated that the bentonite and phosphoric acid are not reactive in the dry mix but the mix may be easily rendered plastic by the addition of water to enable the wetted mix to be placed as a liner in a furnace for example, to be fired in situ to provide a monolithic wall structure.

Keel et al teach the art of how to make a refractory adhesive that contains a large proportion of mullite mixed with ceramic fibers, colloidal silica, alumina and bentonite. The resulting mix, when fired acts as an electrically insulating binder that has refractory properties.

Alliegro et al describes another type of raw batch for a refractory mix adapted to be rammed or gunned into place to form a monolithic liner in a furnace or the like. He describes a basic selection of grain sizes for the essential refractory component together with sintering aids and fluxes designed to produce a fired wall having a minimum degree of porosity.

Havranek et al also shows a reactive gunning mix for producing monolithic furnace liners wherein a refractory dry mix containing a calcium aluminate cement is one component that is mixed with a second silica sol component and water when the cement is being prepared for placement. Reactive alumina is included in the dry mix portion and apparently combines with the silica when the monolithic wall is fired while the water content required by the calcium aluminate cement can be reduced by reason of the addition of the silica sol in order to increase the green strength of the cement during placement in the wall.

DISCLOSURE OF THE INVENTION

The cement forming the substance of this invention provides a special purpose cement for bonding silicon carbide and silicon carbide bonded with silicon oxynitride or silicon nitride bonded bodies together. The silicon carbide bricks are known and the silicon carbide-silicon oxynitride bonded refractory shapes may be made as disclosed in U.S. Pat. Nos. 3,356,513, 3,639,101 and 3,679,444; silicon nitride bond silicon carbide products are disclosed in U.S. Pat. No. 3,968,194. Such silicon carbide containing products are known to have an excellent life and superior performance characteristics in certain corrosive environments including both oxidizing and reducing atmospheres. A need has developed to provide an "inexpensive" equally inert and easily used cement for building silicon carbide and silicon carbide-silicon oxynitride bonded liners in vessels adapted for use for containing such environments, for example in cementing such bricks together to form liners in iron and steel production furnaces. The cement, in addition to having stable characteristics for use in these furnaces, must also have generally the same thermal properties or ones that closely match the expansion and contraction properties of the bricks forming the furnace lining.

It is the object of this invention therefore to provide a cement mixture that has these properties. The mixture disclosed in more detail below will be found to have excellent storage life, can be easily mixed with water and has good spreading properties when being used, is quick setting and upon being fired to cure the bond, has excellent compatibility with silicon carbide and silicon carbide-silicon oxynitride bonded bricks. The thermal properties of the cement of this invention are nearly identical with such properties of these silicon carbide containing bricks and the cement adheres well to their surfaces.

EXAMPLES OF THE PREFERRED EMBODIMENTS

The cement is first formed as a raw batch mixture adapted for storage in suitable containers until needed for bonding bricks in a furnace or the like. The raw batch includes a major proportion of a calcined refractory fine grained mullite that contains at least 70% alumina, ball clay, a chemically active fine particle alumina component, a relatively pure bentonite clay, sodium silicate and a borosilicate glass frit.

This raw batch mix disclosed herein stores well and may be mixed with water when a furnace liner is being assembled. The batch mixes easily with water and the bentonite serves to plasticize the wetted mixture that is adapted to be easily spread to be disposed between the surfaces to be bonded together. The bentonite clay further provides a source of silicate for reacting with the chemically reactive alumina to produce mullite in situ to enhance the bonding action.

The refractory grain, clay and reactive alumina constituents are present in proportions designed to produce a fired in situ mullite cement. The sodium silicate after being wetted during the preliminary preparation of the cement acts as an air setting bond and the borosilicate is a glassy frit to bond the cement as it is being fired at a temperature of 750° C. to finally set the cement for bonding the silicon carbide containing bricks in place. The borosilicate also dissolves some of the mullite to form a tight bond with the surface of the bricks and a protective glassy coating to protect the mass of the cement between the bricks from the corrosive vapors produced within the furnaces and in other high temperature apparatus where silicon carbide containing bricks have been found to be particularly useful.

The raw batch for the cement is formulated with a predominant calcined refractory mullite grain containing at least 70% alumina prepared to fall within a size range fine enough to produce a thin mortar joint but not so fine that shrinkage occurs and preferably is ground to produce a graded mass of grains all of which have a size to pass through a 50 mesh U.S. Standard Sieve. The mullite grain is supplied in an amount of from 70% to 90% of the weight of the final raw batch mix. Preferably this mullite grain comprises 77% by weight of the raw batch mix and for this purpose a commercial calcined mullite is used. Zircon, which has a coefficient of expansion that matches that of mullite and is refractory, inert and stable, can be substituted for up to 100% of the mullite grain in the present mortar.

Any commercial ball clay may be provided for use in the mix and should be present in a range of from 2% to 7% by weight of the raw batch. Preferably the ball clay is used in an amount of 5% of the total weight of the batch.

Also, in the preferred mix 5% of the weight of the batch is a chemically active fine alumina product. This alumina reacts with some of the silica brought into the mix in the ball clay and also with some of the silica of the bentonite clay constituent. Variations in the raw batch mix may contain fine particles of alumina present in a range of from 2% to 10% of the weight of the raw batch.

Bentonite clay may be distributed throughout the raw batch in a range of from 1% to 4% of the weight of the raw batch. Preferably bentonite is used to improve the plasticity of the mix and is present in an amount of 2% of the weight of the raw batch.

Dry sodium silicate is provided in the raw batch in a range of from 0.5% to 1.5% by weight of the batch but preferably an amount equal to about 0.75% of the weight of the batch.

A glass frit is also present in the mix in a range of from 5% to 15% of the raw batch weight and preferably in an amount of 10% of the weight of the batch is borosilicate. Normally the glass frit is a borosilicate based glass. However, any low water solubility silicate frit having good fluidity above 750° C., can be used.

The sizes of the mullite grains are selected to be preferably less than about 50 mesh on the U.S. Standard Sieve scale. A range of grain sizes, as is known, is preferably combined to provide a mass of grains in the mix that is adapted for optimum packing. In any event the grain sizes of any of the constituents in the mix should never exceed a dimension that is more than one-half the thickness of the joint being cemented.

Finely ground chemically active alumina and bentonite clay are well known commercially available materials. The sodium silicate and borosilicate glass frit are finely ground materials which will pass through a 100 mesh screen. As stated above, the sodium silicate provides a low temperature air dried temporary bond for the cement after it has been mixed with water and spread between the surfaces to be adhered. The borosilicate glass frit melts to form a bond when the temporarily cemented structure is heated to 750° C. and in its fluid state, the glass frit dissolves some of the mullite to enhance the bond between the silicon carbide containing bricks that are being bonded together and the preponderant mullite component of the cement. The glass frit adheres equally well to the brick surface and the mullite, and also modifies the thermal characteristics of the mullite containing cement. This glassy frit also provides a surface sealant to protect the exposed edges of the cement layers from reaction with the corrosive atmosphere within the furnace.

The raw batch described above may be stored conveniently for long periods of time in any normal warehouse facility in moisture proof containers. When it is to be used, sufficient water is mixed with the raw batch composition to render it spreadable. It has been found that water added to the batch in an amount of about 33% of the weight of the raw batch provides a reasonable mixture. The wetted mix may then be spread and the silicon carbide containing bricks can be laid up in the known manner to line a reduction furnace for example. The lined furnace is then warmed somewhat to drive off the water while the air dried sodium silicate cements the bricks forming the liner together. After the cement has been air dried, the furnace can then be heated, and as the temperature is raised the chemically active alumina begins to react with the silica of the clay components to form additional mullite in situ to aid in sintering the refractory grains together. Above 750° C. the borosilicate frit becomes liquid and dissolves some of the mullite to promote bonding between the cement and the surface of silicon carbide containing bricks. In addition, the chemically active alumina begins to react with the silica to form mullite in situ.

The resulting fired cement has been found to be particularly useful for cementing together silicon carbide refractory shapes. The resulting fired cement will be found to have some porosity usually in the range of about 20% pores. When the in situ mullite formation takes place as the reactive alumina combines with the silica of the clays, a slight expansion in the reaction mass results that fills a portion of the pores left between the particles.

The reacted mass containing a predominately mullite or zircon component is inert in either an oxidizing or reducing atmosphere and the additives together with the mullite or zircon forms a cured cement that has a coefficient of expansion upon being heated and cooled that is nearly identical with that of the silicon carbide containing bricks. The life of the bond is thus prolonged and the integrity of the cemented brick structure is continued for a longer time as compared with brick liners cemented with mortars used heretofore. The cement formulated with water is easy to spread and the glass frit has been found to accelerate the in situ mullite formation between the chemically active alumina and silicate to facilitate the sintering of the cement in place and produce a stronger bonding of the mullite to the silicon carbide containing bricks.

A combined mullite, sodium silicate and glass cement results wherein shrinkage is substantially entirely eliminated as the bonding action is essentially due to the slight expansion that accompanies the reaction of the chemically active alumina with the silica of the clay content of the batch, which expansion compensates for any shrinkage that might otherwise take place as the sintering process proceeds. The resulting fired cement may have a porosity ranging between from 10% to 30% but usually has a porosity of 20% within the ultimate sintered mass.

The raw batch may be used for cementing silicon carbide containing bricks or other such silicon carbide structures together if an occasion should arise. The cement may in general suggest itself for use with any other inert refractory composition having a coefficient of thermal expansion equal to that of a silicon carbide containing brick. However, since the glass frit in combination with the mullite has an affinity for bonding with the silicon carbide product, the herein disclosed cement has a particular use for this purpose.

What is claimed is:

1. A raw batch adapted to be mixed with water to form a mortar adapted to be dried and then fired in situ particularly for use with silicon carbide containing elements including silicon carbide shapes bonded with oxides, silicon nitride or silicon oxynitride comprising a mixture of from 70% to 90% by weight of a calcined refractory mullite grain containing 70% alumina, from 2% to 7% by weight of a ball clay, from 2% to 10% by weight of a finely ground chemically active alumina, from 1% to 4% by weight of a purified bentonite, from 0.5% to 1.5% by weight of sodium silicate, and from 5% to 15% by weight of a glass frit.

2. A raw batch as in claim 1 wherein said calcined refractory grain is present in an amount of 77% by weight, said ball clay is present in an amount of 5% by weight, said chemically active alumina is present in an amount of 5% by weight, said bentonite is present in an amount of 2% by weight, said sodium silicate is present in an amount of 0.75% by weight, and said glass frit is present in an amount of 10% by weight.

3. A structure comprising silicon carbide containing elements cemented together, wherein the cement for bonding said elements is the reaction product formed by the in situ firing of a mixture of grains, said mixture including from 70% to 90% by weight of a calcined mullite refractory grain containing 70% alumina, from 2% to 7% by weight of a ball clay, from 2% to 10% by weight of a finely ground chemically active alumina, from 1% to 4% by weight of bentonite, from 0.5% to 1.5% by weight of sodium silicate, and from 5% to 15% by weight of a glass frit.

4. A structure as in claim 3 wherein said mixture included 77% by weight of said refractory grain, 5% by weight of said ball clay, 5% by weight of said chemically active alumina, 2% by weight of said bentonite, 0.75% by weight of said sodium silicate, and 10% of said glass frit was present prior to firing.

5. A fabricated refractory apparatus formed of a plurality of interfitted silicon carbide containing shapes having oppositely disposed faces cemented together comprising a cement disposed between the faces of said interfitting silicon carbide containing shapes, said cement being the reaction product resulting from the in situ firing of a mixture containing from 70% to 90% by weight of a calcined mullite refractory grain containing 70% alumina, from 2% to 7% by weight of a ball clay, from 2% to 10% by weight of a finely ground chemically active alumina, from 1% to 4% by weight of bentonite, from 0.5% to 1.5% by weight of sodium silicate, and from 5% to 15% by weight of a glass frit.

6. A fabricated apparatus as in claim 5 wherein the cement between said faces has exposed edges that are insulated from exposure by reason of the borosilicate glass frit and mullite that form a seal on said exposed edges.

7. A raw batch adapted to be mixed with water to form a mortar adapted to be dried and then fired in situ particularly for use with silicon carbide containing elements including silicon carbide shapes bonded with oxides, silicon nitride or silicon oxynitride comprising a mixture of from 70% to 90% by weight of a calcined refractory zircon grain, from 2% to 7% by weight of a ball clay, from 2% to 10% by weight of a finely ground chemically active alumina, from 1% to 4% by weight of a purified bentonite, from 0.5 to 1.5% by weight of sodium silicate, and from 5% to 15% by weight of a glass frit.

* * * * *